United States Patent Office 3,171,729
Patented Mar. 2, 1965

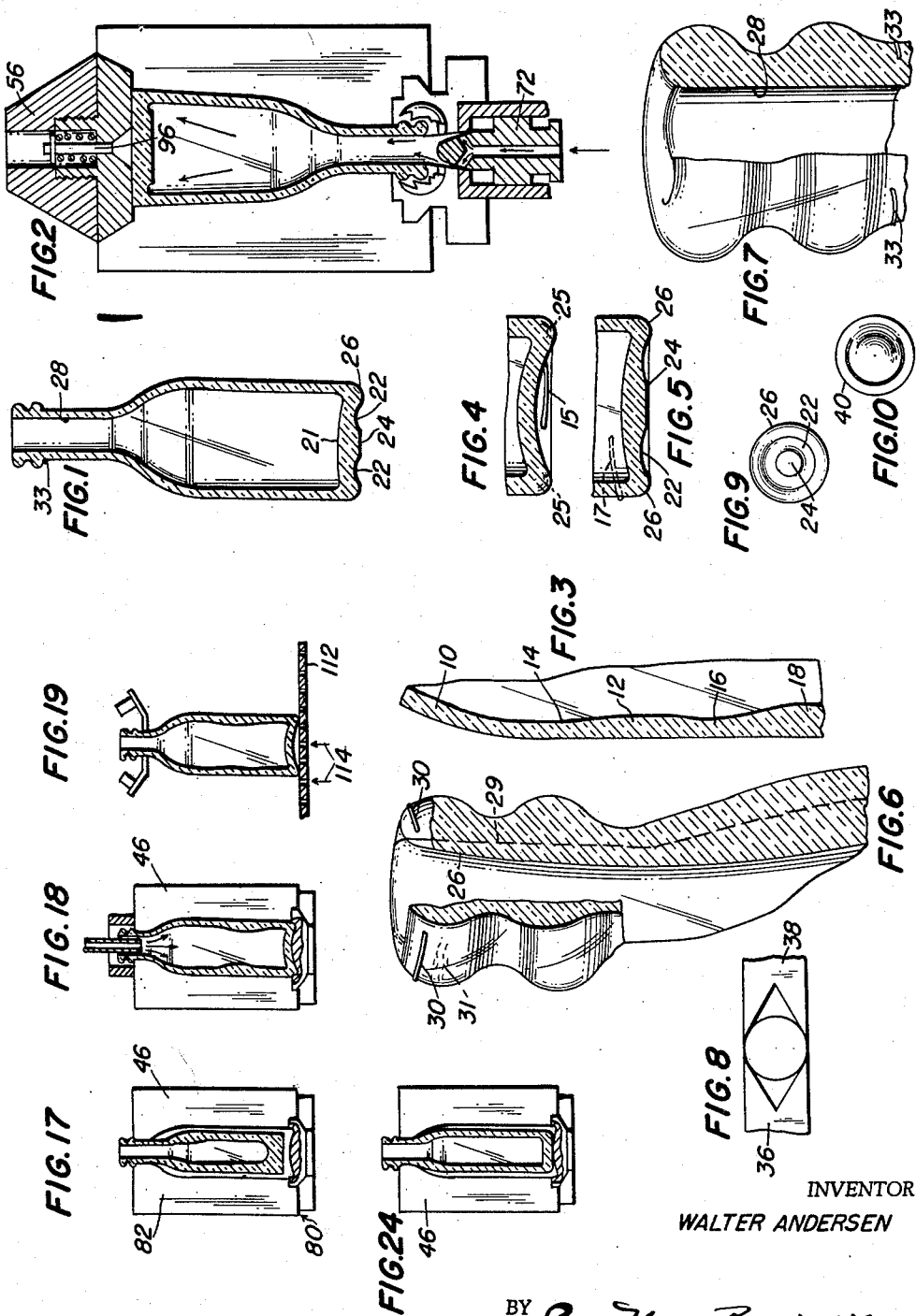

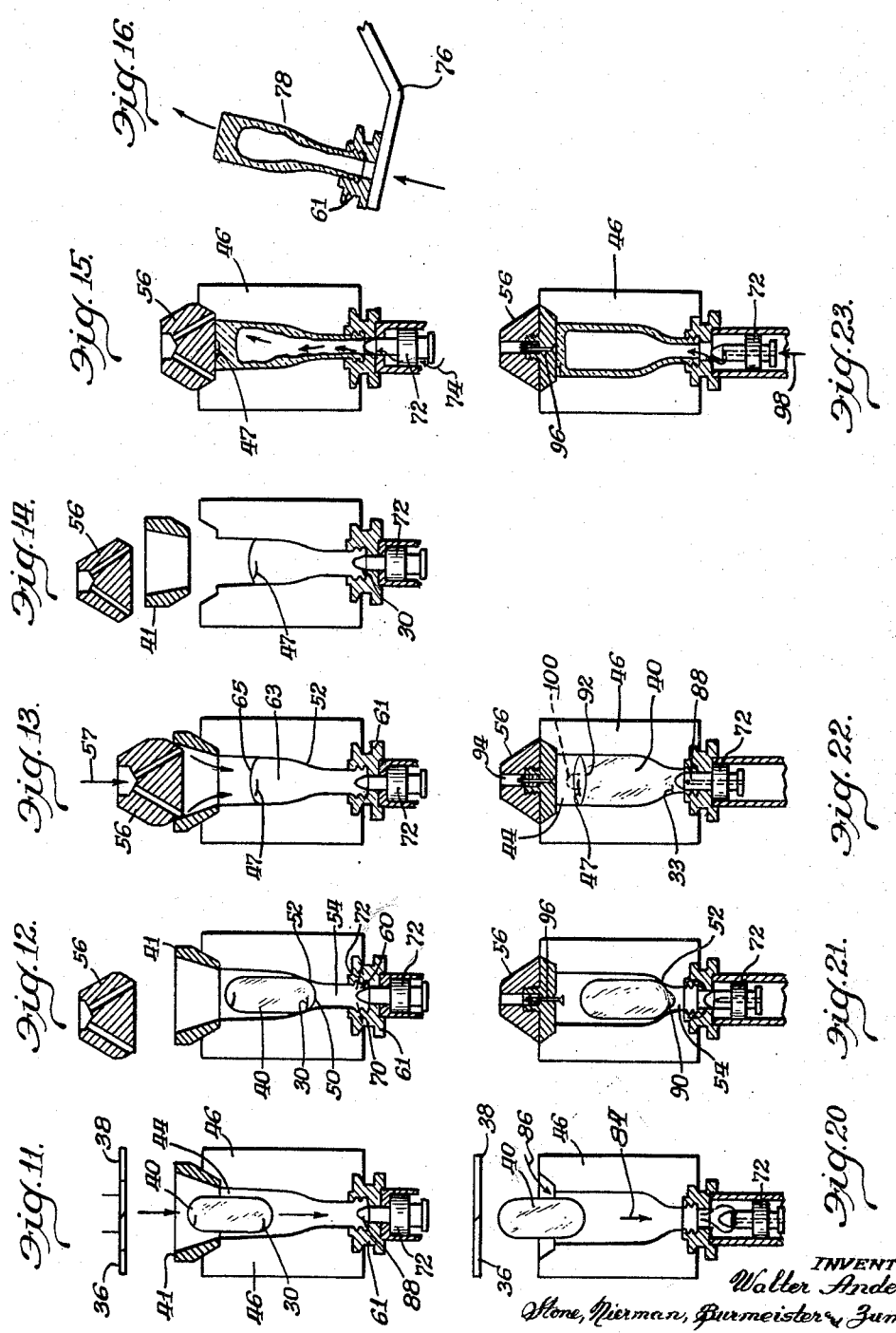

3,171,729
METHOD OF MAKING A PARISON
Walter Andersen, Streator, Ill., assignor, by direct and mesne assignments, to Chem-Met-Anderson Engineering Company, Chicago, Ill., a corporation of Illinois
Filed July 27, 1961, Ser. No. 127,203
4 Claims. (Cl. 65—76)

This invention relates to a machine-made glass bottle and to the method of making it. This application is a continuation-in-part of United States application Serial No. 30,818, filed May 23, 1960, entitled "Method and Apparatus for the Elimination of Settle-Blow in Making Bottles."

The general object of this invention is to produce the bottle whose vertical cross section is shown in FIGURE 1. Comparing this section with that of a standard machine-made bottle, three differences exist. Firstly, the thickness of the side wall of the standard bottle is irregular as shown in the enlargement in FIGURE 3. This irregularity is called "settle-blow." An undesirably thick wall is shown at 18, and a satisfactory thickness at 10 and 12. It is apparent that the bottle is as strong as the walls 14 and 16 and that hence, if the wall at 10 and 12 is the minimum thickness that will withstand the specified pressure for the bottle, the bottle may break at 14 or 16, and that it contains unnecessary glass. Since the cost of the bottle is based in part on the amount of glass in it, and since the cost of shipping is based on the weight of the glass, the elimination of unneeded glass is important. The first specific object of this invention is, therefore, to produce a machine-made bottle having a side wall of uniform thickness from bottom to neck, that is, one without "settle-blow."

Secondly, the bottom of the standard bottle in FIGURE 4 consists of an inwardly directed crown or arch. It contains an excessive amount of glass. This crown is necessary to distribute the internal pressure at the circular line of joinder of the bottom to the side wall, called the chine. This shape of the bottom is helpful only to resist internal pressures. This bottom is susceptible to breaking by an external blow, as by a blow from the cap of another bottle resting against it, as in many vending machines today. In the bottle of FIGURE 1, the internal arch 21 of the bottom is less pronounced, the volume of glass is less, and the bottom has an annular arch 22 between the center core 24 and the chine 26, see FIGURE 5. The bottom of the central core 24 is close to the plane of the transverse plane of the chine. There is a difference in the chine of the bottle of FIGURE 4 and that of the bottle of FIGURE 1. In the bottle chine of FIGURES 1 and 4, there are many craze lines 25 lying in the chine. These are difficult to see with the naked eye, but they are a source of weakness and are chiefly responsible for the breaking of bottles at the testing station. These craze lines 25 develop as the result of using slightly chilled glass in the bottom of the parison when it is formed into the bottle chine in the blow mold. They are enlarged during the air blowing on the dead plate. Still another difference in the bottoms of the applicant's bottle in FIGURE 1 and the standard bottle is the position of the cutoff line. In the bottom of the standard bottle of FIGURE 4, the cutoff line 15 is in the bottom of the bottle, see FIGURE 4, whereas in applicant's bottle of FIGURE 1, the cutoff line 17 is in the wall of the bottle immediately above the chine. The second object of the invention is, therefore, to make a bottle having the bottom of the bottle shown in FIGURES 1 and 5, without craze lines at the chine and with the cutoff line in the wall of he bottle above the chine.

The third difference between the bottles shown in FIGURE 1 and the standard bottle is at the mouth orifice where they differ in several respects. An enlargement of the orifice of a standard bottle is shown in FIGURE 6, and an enlargement of the bottle shown in FIGURE 1 is shown in FIGURE 7. The wall 26 is not straight as compared with the wall 28 of FIGURE 7. The bottle orifice of FIGURE 6 carries an excessive amount of glass and the opening is reduced inside. The added thickness of glass in the orifice extends into the neck of the bottle as shown in FIGURE 6. The wall of the neck of the bottle of FIGURE 1 should be substantially the same as that of the main portion of the bottle as indicated by the dash line 29 of FIGURE 6. Importantly, the external finish of the orifice of the standard bottle is rough, and at the completion of the bottle-forming operation, it must be fire-polished, an expensive operation. The third difference between the two orifices is the gob cutoff line 30 which in FIGURE 6 is shown around the lip of the orifice, whereas in FIGURE 7, its counterpart 33 in applicant's bottle of FIGURE 1, is shown in the neck itself. This cutoff line is shown as a U-shape wale, but actually it is not perceptible to the touch, although clearly visible in the glass.

The third specific object of the invention is to make a bottle having an external orifice wall of finished glass which need not be fire-polished, having a wall thickness in the orifice and adjoining neck comparable to that of the body of the bottle, and having the cutoff line in the neck and not in the wall of the orifice.

The second general object of this invention is to provide a method for producing the bottle of FIGURE 1. The method consists of two steps, both occurring in the blank or parison mold. The first step is to draw the gob of glass into the neck ring mold (which forms the orifice of the bottle) by suction in the absence of settle-blow pressure on the top of the gob. It is necessary in the parison mold to form and set the orifice of the bottle in the ring neck mold because upon the opening of the blank mold, the bottle will be moved from station to station by holding just the ring neck mold. To effect this, in present practice, the plunger is positioned in the ring neck mold. There is provided between the two halves of the blank mold at the orifice, a clearance of 0.007-inch. A baffle supplied by air at 40 p.s.i. closes over the top of the blank mold and air is forced downwardly upon the glass gob. The hot air, at atmospheric pressure and at a temperature of perhaps 1000° F. and trapped below the gob, is forced out through the 0.007-inch clearance by the air pressure on the top of the gob, and the glass is forced into the ring neck mold. As a substitute for air pressure in this step, there is the press-and-blow method wherein a plunger comes up from below into an inverted parison mold and forces out the trapped air and then forces the glass into the ring neck mold. In some applications, when the plunger is seated in the orifice, a vacuum is drawn so as to assist removal of the trapped air below the gob. In either of these practices, one gets the unwanted thickness of the glass at the neck, "settle-blow" in the body wall and an extra heavy bottom.

Applicant's step is to utilize hot glass to form the orifice of the bottle, and this is done by sucking hot glass from the center of the gob and not glass which has touched walls of the mold when dropping into the mold. The step is drawing a vacuum of as low as 3–5 pounds, or 25–28 inches of mercury, at the ring neck mold with the plunger retracted at the time the gob passes the top opening of the parison or blank mold. The passageway through the ring neck mold is open. In performing the step, the air from above the parison mold and around the parison mold is sucked downwardly, thereby cooling the mold walls and the plunger head. The plunger head rises to meet the descending gob, and if properly timed, when the descending gob is momentarily stopped by the shoulders of the inverted parison mold, the plunger is about halfway toward home position, and still permits air to be sucked freely through the ring neck mold. When the gob seals between its side wall and the inside of the parison mold at the shoulder, the small amount of air, already at low pressure, is instantly evacuated and the center of the gob which has touched no mold wall, is sucked down, pulling a portion of the side walls which encountered the shoulder. As the gob reaches the ring neck mold, the plunger is closed and seats upon the ring neck mold, and the remaining air at 3–5 pounds pressure escapes through the 0.070-inch clearance between the faces of the plate molds and the ring molds.

By applicant's first step, the bottle orifice is formed with very hot glass, but most importantly, by walls which are comparatively cool. The fact of this coolness is established by inspection of the visible condition of the top of the plunger in steady operations under either the blow-and-blow method or the press-and-blow method, and applicant's suction-and-blow method. Looking down into the parison mold after the removal of the funnel, but before reseating of the baffle, in the blow-and-blow or press-and-blow methods, the top of the plunger is red hot, whereas operating the same machine with applicant's method of evacuating the orifice end of the blank mold while dropping the gob, the plunger is black. The reason for this is that applicant starts to suck down air through the orifice of the blank mold almost immediately upon closing the blank mold. For perhaps a second, there is a flow of ambient air (100° F. maximum temperature) downwardly through the blank mold and the ring neck mold and over the plunger head. The lower a position in the blank mold, the lower is its air pressure. The suction step has, therefore, three advantages. Firstly, it cools the mold; secondly, it creates little resistance to the flow of the gob into the neck; and thirdly, it sucks out of the center of the gob the hottest glass to form the neck. The result, as will appear in the timing description hereinafter presented, is that the counter-blow may be brought on very quickly, and being brought on very quickly, it can remove much of the glass in the neck so that the thinner walls of FIGURES 1, 5 and 7 may be obtained.

The first step of applicant's sucking out the air from a time shortly after the blank mold halves close to the time the ring neck mold is set, without the use of any settle-blow or press-blow, is also responsible for the elimination of the settle-blow in the bottle wall. Under present practice, the settle-blow compacts the glass on the top so that it forms a sort of mound, tends to become more set, i.e., chilled, with the hotted glass inside the gob and the result is that when the counter-blow occurs, the top layer of the parison is pushed up against the bottom of the baffle and results in an excessive amount of glass in the bottom. As a result of applicant's using ambient air on the top of the gob, it assumes a concave curvature with no excessive amount of air hardening it.

The second step of applicant's method is to form the greater part of the bottom of the bottle in the parison mold. Specifically, the step is to force hot glass from the center of the gob against a comparatively cold bottom wall in the parison mold. The result is that a central portion of the bottom of the bottle is formed in the parison mold and when removed to the blow mold or bottle mold, this center remains set while inwardly positioned hot glass is forced outwardly to form the chine. A feature of the invention is the provision of a valve head in the center of the baffle which closes the top of the blank mold. This valve head is cooled in part by the exhaustion of air at atmospheric pressure from above the parison during the counter-blowing stage. This valve is closed by the glass itself, and in closing it, the glass is lightly chilled. Inasmuch as the perimeter of the orifice of the valve in the baffle is also cooled by the exhaustion of air, a circular center of slightly chilled glass, in the case of a two-inch diameter bottom bottle, of about one-inch diameter, is formed. When the parison is moved over to the blow mold, the outer surface of this bottom is chilled and somewhat rigid with the result that the air pressure applied during the blow mold stage, pushes the inner, hot, semi-fluid glass off this chilled section over into the chine. The bottom of the bottle as it leaves the blow mold, therefore, has a somewhat chilled center of perhaps one inch in diameter with a softer annulus around it and the result is that during the bottom-blowing step on the dead plate, the semi-rigid center tends to hold its position while the annulus of softer glass around it is blown upwardly to give the cross section shown in FIGURE 5.

The foregoing objects are attained in the method described in the following description made in connection with the drawings, wherein:

FIGURES 1 and 3 through 7 are illustrations of differences between the existing standard machine-blown glass bottle and applicant's bottle of FIGURE 1; FIGURE 1 being a transverse section of applicant's bottle; FIGURE 2 being a transverse section of the existing machine-made bottle; FIGURE 3 being an enlargement of that portion of the bottle wall of a standard bottle; FIGURE 4 being an enlargement of the bottom of a standard bottle; FIGURE 5 being an enlargement of the bottom of the bottle of FIGURE 1; FIGURE 6 being a perspective of the mouth orifice of a standard bottle, enlarged and partly cut away; and FIGURE 7 being a perspective view of the mouth orifice of the bottle shown in FIGURE 1, enlarged and partly cut away.

FIGURE 2 is an enlargement of schematic FIGURE 21 for the purpose of showing air passageways through a plunger and ring neck mold.

FIGURES 8 and 10 are schematic views illustrating the cutoff line and manner of forming it in a gob or charge of glass; FIGURE 8 being a view looking upwardly through the opening into the glass feeder with the cutoff blades therebelow; and FIGURE 10 being a top view of the glass gob and showing the cutoff line.

FIGURE 9 is a plan view of the bottom of one of applicant's bottles.

FIGURES 11 through 19 are illustrations of each step in the making of a glass bottle under present practice on one section of a single job, I. S. Hartford bottle-making machine. Only such apparatus is shown schematically as is necessary to understand the method.

Beneath FIGURES 11 through 19 are FIGURES 20 through 24 which show applicant's steps which replace selected standard practice steps, so that the applicant's invention may be clearly noted.

Describing first the existing practice, referring to FIGURE 11, the cutoff plates 36 and 38 have just dropped a gob of glass 40 through a removable funnel 41 into the upwardly open blank mold cavity 44, which is formed by two blank mold plates such as 46, the plate closing from the front not being shown. A second before the two mold plates had been open to the ambient air which when a glass machine is operating may be 100° F. or even higher. The plates, themselves, are extremely hot, during some operations approaching 1000° F. The temperature of the air in the cavity formed by the closing plates immediately rises so that when the gob of glass is in the position shown in FIGURE 11, it is dropping into air which is at atmospheric pressure, and which has a temperature between 500 and 1000° F. Importantly, the ring neck mold has been closed since shortly after it left the top of the blow mold cavity, and air within it becomes heated. The bottom of the ring neck cavity is closed because the plunger 72 is in its upper position, that is, seated in the ring neck. The only way that air can escape is through a 0.007-inch clearance between the mating surfaces of the ring neck mold and sometimes between portions of the mold plates themselves.

As the gob of glass descends into the mold cavity, it strikes the shoulder 52, see FIGURE 12, between the main body cavity of the parison and the neck where it is momentarily stopped because the gob seals itself to the walls and the air has only a limited path to escape. At this moment, the baffle plate 56 moves downwardly and occupies the position shown in FIGURE 13. The gob of glass 40, however, is still in the position shown in FIGURE 12, but beginning to settle. Thereupon, air at 40 p.s.i. is introduced along the arrow 57 through the baffle plate, and the gob of glass first expels the very hot air in the space 54, and then itself is forced downwardly into the ring neck mold 61 to complete the finish on the bottle orifice. Two things are to be noted. The air introduced through the baffle, called the "settle-blow," forced downwardly the glass which had engaged the shoulder 52 of the mold because the cutoff line 30 now appears in the outside rim of the bottle orifice as indicated in FIGURE 13. This means that the settle-blow forced that glass which are partially chilled by the shoulder 52 downwardly into the ring neck mold and that this partially chilled glass could not reset to get a completely smooth external surface.

The result is that all bottles must have their orifices fire-polished in a separate costly step when the bottle is moved between the glass machine and the tempering lehr.

When the finish on the bottle orifice is completed, the gob of glass has the appearance shown in FIGURE 13 with a concave or mound-like top surface. That skin of the glass which engages the parison blank walls has been chilled. It is at a lower temperature than the glass in the center 63 of the gob. The top of the mound 65 has been chilled by the incoming air through the baffle 56, and although not as much, it is enough to explain the position of the upper cutoff line 47 as it appears in FIGURE 15.

Returning to FIGURE 14, after the completion of the settle-blow, a time-consuming pause of as much as two seconds occurs while the baffle 56 is removed, the funnel 41 removed, and then the baffle 56 returned to the position shown in FIGURE 15. The air above the parison is now trapped excepting that a clearance of about 0.007-inch is provided between the seating surfaces of the baffle and the blank mold plates. When the baffle 56 is fully seated, the plunger 72 retracts and compressed air at about 40 p.s.i. moves up along the continuous arrow 74 to blow the glass upwardly to form the parison as shown in FIGURE 15. In doing this, the upper skin of the glass, indicated in FIGURE 14, was pushed up against the top of the blank mold cavity. Moreover, the pause in the operation which made it possible to remove both the baffle 56 and the funnel 41 and return only the baffle, resulted in more glass hardening in the ring neck mold than is desirable, and this resulted in the wall shown in the enlarged portion of a bottle in FIGURE 6.

Also, the settle-blow step of FIGURE 13 resulted in the side wall of irregular thickness illustrated in FIGURE 3. Returning to FIGURE 13, the skin of the gob 40 has chilled and the action of the counter-blow of FIGURE 15 is to push the partially chilled skin as well as the softer interior of the gob with the result that a cross section of the wall of the parison looks like what is shown in FIGURE 15, although this is exaggerated.

At the time of completing the parison after the counter-blow is turned off, therefore, the upper cutoff line 47 is in the bottom of the parison, the lower cutoff line 30 is in the external surface of the orifice of the bottle, excessive glass is on the inside of the orifice, and the wall of the body of the parison is not of uniform thickness.

The remaining steps of the present process are these: Referring to FIGURE 16, the plates of the blank mold have opened, the baffle 56 has been retracted, the ring neck mold 61 continues to hold the bottle which is then inverted by mechanical means 76, and the parison 78 is positioned at the blow mold station 80, see FIGURE 17. The two halves, 82 only being shown, close, and referring to FIGURE 18, the parison is blown into the final shape. This blowing step tends to exaggerate the differences in the thickness in the side walls of the parison. It does not reduce the amount of glass in the neck of the orifice. It leaves the two cutoff lines 30 and 47 as they were in the parison, and the roughness on the external surface of the orifice remains.

The above standard practice on I. S. Hartford machines is varied in two ways. Firstly, in the so-called press-and-blow method, the solid plunger is substituted for air, in performing the step at FIGURE 13. The plunger affects the gob in substantially the same way as does the air, although on the removal of the plunger, the top of the parison is closer to being level. Also, in some machines, in performing the steps shown in FIGURES 11, 12 and 13, with the plunger seated and closing the orifice, a vacuum is drawn around the ring neck orifice to assist in the removal of the air trapped below the gob and indicated at 54 in FIGURE 12.

Observation of the cavity walls of the mold plates of the ring neck mold, and particularly of the nose 88 of the plunger 72, during operation shows that they are almost at red heat. Looking down into the parison mold cavity 44, one sees the plunger nose 88 a deep red.

Applicant's process is illustrated in FIGURES 20 to 24, which are positioned immediately below the same steps of the standard process. Applicant's first step is to maintain the plunger 72 in retracted position at the time that the cutoff knives 36 and 38 sever the gob 40 at the outlet of the feeder, and simultaneously drawing a comparatively low vacuum along the arrow 84 so that there is a rush of ambient air along the line of the arrow 86 through the cavity of the parison mold and the cavity of the ring neck mold. The plunger 72 moves upwardly, but does not fully seat until the gob reaches the ring neck mold.

Between the positions of FIGURE 20 and FIGURE 22, applicant shows FIGURE 21 where the plunger 72 has traversed about half the length of its stroke so that it is still permitting the passage of air around the nose 88, and with firstly, the gob of glass 40 engaging the shoulder 52 of the mold, but with a central dependent globule of glass 90 showing. The glass in the globule has not touched any solid surface. The gob as a whole is being forced down by the differential of air pressure at say 15 p.s.i. and the low pressure in the space 54 at 3–4 p.s.i. The hottest glass in the gob is about to be used to form the orifice of the throttle. This is what happens. The soft glass reaches the ring neck mold, which is demonstrated by the fact that the cutoff line 30 now appears between the orifice and the neck, as indicated by the numeral 33 in FIGURES 22 and 7. Also, the top of the gob 40 is concave as indicated at 92 of FIGURE 22. The passageway 94, closed by a valve 96, is provided in the baffle. The valve 96 has a clearance with its seat of about 0.007-inch so as to relieve pressure in the mold.

It should be stated that the suction is not withdrawn when the plunger 72 seats, but ducts are provided to permit the escape of air through the clearances of 0.007-inch between the plates. However, at the moment that the main suction line is cut off by the plunger 72 with the gob commencing to run down, the air pressure in the space 54, see FIGURE 21, is believed to be well below 3–6 p.s.i., or about 25 inches of mercury.

Applicant's next step is the counter-blow step and because the applicant does not have to remove the funnel nor control compressed air going through the baffle, he can exactly control the amount of glass left in the bottle orifice. The completed counter-blow step is shown in FIGURE 23, and results from compressed air being forced upwardly along the continuous arrow 98 through the ring neck mold which is standard practice. But in standard practice, the plunger must remain in seated position, that is, as shown in FIGURES 20 or 11 through 14, until the baffle 56 and the funnel 41 have been removed and then the baffle 56 replaced and seated. During the interval of time which is a minimum of two seconds, the glass in the ring neck mold chills to a point such that the counter-blow cannot expel enough of it, and hence one gets the bottle neck shown in FIGURE 6. Applicant's counter-blow has no such limitation. By reversing a valve, applicant can bring on the counter-blow a fraction of a second after the plunger has been retracted as in FIGURE 22. He can do this so quickly that he can blow all of the glass back out of the ring neck mold. All that is necessary now is to maintain a selected temperature of the ring neck mold and blank mold by the air-cooling suction step of FIGURES 20 and 21, and to retract the plunger from the position of FIGURE 22 to that of FIGURE 23 when the desired amount of chilled glass in the ring neck mold has been reached. When the counter-blow comes on, it will blow out whatever amount of glass remains soft. The time interval is determined by experiment and, of course, varies with the particular kind of glass that is being used, the temperature of the gob at it leaves the feeder from the glass furnace, and operating temperatures of the parison mold components of a particular machine. Applicant's eliminating the formation of the bottle orifice by means of an action on top of gob makes it possible to control the amount of glass in the wall of the bottle orifice and neck.

The force pressing the glass into the neck and orifice is superior to present forces. In applicant's method the air at the top of the gob is at 15 p.s.i., whereas there is about three pounds of air pressure below the gob with the result that the differential is 4–1 to 6–1. In the present press-and-blow method, the differential is 40 pounds to 15 pounds, or about 3–1. Moreover, the chilling effect of air at three pounds on the bottom of the glass gob is proportionally less than the chilling effect of air at atmospheric pressure.

Referring again to FIGURE 22, the upper cutoff line 47 is seen to be on the inside of the concave surface. The top of the parison has not touched metal so as to chill it nor has it been touched by high pressure air. The only chilling effect comes from atmospheric air. When the counter-blow step shown in FIGURE 23 occurs, a globule of hot glass, indicated by the dotted-line 100, see FIGURE 22, moves upwardly as a result of the counter-blow. The air in the cavity 44 is pushed out past the valve 96. This helps cool the valve. This globule is centrally positioned with respect to the upper cutoff line 47. When the blowing in the parison mold is completed, as shown in FIGURE 23, the cutoff line is now in the side wall of the parison instead of in the bottom. Moreover, the cool head of the valve 96 chills the central portion of the parison. This chilling of the central bottom in the parison mold sets the central portion of what ultimately becomes the bottom of the bottle. The use of hot glass in blowing both the orifice and the bottom has the net effect of producing a parison having walls of comparatively even thickness throughout.

When the parison is moved over to the bottle-blowing mold, see FIGURE 24, the application of air here expands the parison to obtain the bottle of FIGURE 1.

Up to this point, applicant has emphasized the steps of his method for the purpose of accounting for a superior finished bottle. Bottle manufacturers are enthusiastic because the bottles are equally strong although light and do not require the expensive fire-polishing of the orifice. But their interest in the improved bottle is small compared with their interest in the fact that an I. S. Hartford machine can produce thirty percent more bottles than under the present practice per minute. An I. S. Hartford double-gob, six-section machine producing at the rate of 90 a minute has no difficulty in producing with applicant's method 120 bottles a minute, and they are in fact running as much as 130 bottles a minute. In the chart below, applicant has set up on a time basis, the steps by standard practice and the steps by applicant's practice.

*Comparison of time required to form parison in I. S. Hartford machine by standard and applicant's methods*

| Standard Practice | In Seconds | | Applicant's Method |
|---|---|---|---|
| Blank 46 closed—gob dropped—Fig. 11. | 0 | 0 | Same but suction on plunger 72 starts up—Fig. 20. |
| Funnel 41 down—Fig. 11. | ½ | ¾ | Plunger 72 up—baffle 56 seats—Fig. 22. |
| Plunger 72 up—Fig. 11. | 1 | | |
| Baffle 56 down—Fig. 12 and 13. | 2 | 2 | Suction off—counter-blow starts—Fig. 23. |
| Baffle 56 up—settle-blow ends—Fig. 14. | 3 | | |
| Plunger 72 down. | 3½ | | |
| Funnel 41 up—Fig. 14. | 4 | | |
| Baffle 56 back down—Fig. 15. | 5 | | |
| Counter-blow commences—plunger down—Fig. 15. | 6½ | | |
| | | 7½ | Counter-blow ends. |
| | | 8 | Baffle up. |
| | | 8½ | Blank mold opens. |
| Counter-blow terminates. | 12 | | |
| Baffle 56 up. | 12½ | | |
| Blank Mold opens. | 13 | | |

The vertical spacing is roughly based on time and it can be seen firstly, that by eliminating the movements of the funnel which makes it unnecessary to remove the baffle, there is a saving of 4½ seconds per bottle. The times shown are based upon 13 seconds from the closing of the blank mold to the opening of the blank mold. This time, of course, varies as between single-gob and double-gob machines, as between different kinds of glass, as between different sizes of bottles, as between different methods of cooling. There are other factors, but the relationship of the time of the performance of the various functions in making the parison are basically sound, and comparisons of those times with the times of applicant's method are comparatively correct. As heretofore explained, ¾ of a second time with the plunger 72 up and the baffle 56 seating may be varied slightly, and time for starting the counter-blow in applicant's method at two seconds may be substantially varied to avoid blowing too much of the hot glass out of the orifice neck. Applicant shows the duration his counter-blow at 5½ seconds, exactly the same as in standard practice. In fact, it may be a little bit shorter because the wall of his glass is uniform and thinner and therefore sets quicker.

Applicant's method is practiced on a standard I. S. Hartford, single- or double-gob section machine with, however, a special apparatus which is disclosed in the application of which this is a continuation-in-part.

The final step in forming the bottle bottom shown in FIGURE 5 is practiced on the dead plate shown in FIGURE 19, and the step, itself, is standard. Referring to FIGURE 19, the bottom of the bottle was formed with an arch in the blow mold, but being soft, the arch tends to drop when positioned on the dead plate 112. Air is forced upwardly while the newly made bottle rests on the dead plate along the arrows 114, and the crown is restored. In applicant's bottle, the central core is quite hard and tends to hold its position in the plane of the chine and the air tends to form the annular arch 22, as shown in FIGURE 5.

Having thus described his invention, applicant claims:

1. The method of making a bottle parison which comprises the steps of opening the neck orifice of a parison mold, sucking air through the other end of said mold by a vacuum drawn through the opened neck orifice of the mold, introducing a charge of glass through the other end of the mold, seating a closure member in the neck orifice of the mold as the glass charge reaches the neck orifice, closing the other end of said mold, and immediately after the glass fills the portion of said mold adjacent said neck orifice, withdrawing the closure member from the neck orifice and counter-blowing the parison therethrough.

2. In a method of making a bottle parison wherein a charge of glass is dropped by gravity into an upright parison mold having an open top and an open neck orifice at its bottom and wherein a plunger is movable from a down position away from the orifice so as to leave the orifice wide open and movable back to an up position seated in the orifice so as to close it and wherein a vacuum is being drawn from a point adjacent the orifice, the steps of holding the plunger in its down position with the neck orifice open during the drawing of the vacuum to pull the glass charge toward said neck orifice, of seating the plunger in the orifice as the glass charge reaches said neck orifice, and, immediately after the glass fills the portion of said mold adjacent said neck orifice, closing the open top, retracting the plunger and counter-blowing through the orifice.

3. The method of making a bottle parison which comprises the steps of opening the neck orifice of an upright parison mold, sucking air through the upper open end of said mold and down through said opened neck orifice by a vacuum drawn adjacent the neck orifice, dropping a charge of glass through the upper open end of said mold while continuing to draw a vacuum such that the pressure of the air above the charge of glass is from 4 to 6 times the pressure below the charge, closing the upper open end and the neck orifice of the mold as the glass charge reaches the neck orifice, and, immediately after the glass fills the portion of said mold adjacent said neck orifice, reopening the neck orifice and completing the parison by counter-blowing through said neck orifice.

4. In that type of glass bottle making machinery wherein a parison mold cavity is open at both the bottle bottom forming end and the bottle neck forming end, and wherein there is provided a baffle seatable over said bottom forming end to close the same and a plunger seatable in the orifice of the neck forming end to close said orifice, the method of making a parison which comprises the steps of sucking air through said mold cavity with the baffle and the plunger unseated, said air entering through said bottle bottom forming end and passing out through the orifice of the neck forming end, introducing a gob of glass into the mold during the foregoing step, seating the plunger in the neck orifice as the glass reaches the neck orifice, and then at a time after the baffle has been seated, unseating the plunger and counter-blowing air through the neck orifice.

References Cited by the Examiner
UNITED STATES PATENTS

| | | | |
|---|---|---|---|
| 1,853,861 | 4/32 | Hatch et al. | 65—161 |
| 1,949,886 | 3/34 | Soubier et al. | 65—223 |
| 1,957,410 | 5/34 | Miller | 65—243 |
| 1,959,428 | 5/34 | Hoge | 65—233 |
| 2,129,614 | 9/38 | Bridges | 65—233 |
| 2,433,399 | 12/47 | Roessler et al. | 65—64 |
| 2,471,369 | 5/49 | Garwood | 65—79 |
| 2,648,168 | 8/53 | Rowe | 65—263 |
| 2,826,867 | 3/58 | Nava et al. | 65—229 |
| 2,861,397 | 11/58 | Morel | 65—76 |
| 2,936,920 | 5/60 | Wallace | 215—1 |
| 2,978,131 | 4/61 | Garvey | 215—1 |
| 2,987,854 | 6/61 | Payne | 65—80 |

FOREIGN PATENTS

| | | |
|---|---|---|
| 404,308 | 12/33 | Great Britain. |

DONALL H. SYLVESTER, *Primary Examiner.*

REEXAMINATION CERTIFICATE (420th)
United States Patent [19]
Andersen

[11] B1 3,171,729
[45] Certificate Issued  Nov. 19, 1985

[54] METHOD OF MAKING A PARISON

[75] Inventor: Walter Andersen, Streator, Ill.

[73] Assignee: Virginia Kremm

Reexamination Request:
No. 90/000,038, Jul. 29, 1981

Reexamination Certificate for:
Patent No.: 3,171,729
Issued: Mar. 2, 1965
Appl. No.: 127,203
Filed: Jul. 27, 1961

Related U.S. Application Data

[63] Continuation-in-part of Ser. No. 30,818, May 23, 1960, Pat. No. 3,178,728.

[51] Int. Cl.$^4$ ............................................... C03B 7/00
[52] U.S. Cl. .......................................... 65/76; 65/81; 65/221; 65/233
[58] Field of Search ................... 65/76, 81, 221, 233, 65/263

[56] References Cited
U.S. PATENT DOCUMENTS 2,811,814  11/1957  Winder .................................. 65/239
3,171,728   3/1965  Andersen .............................. 65/76

FOREIGN PATENT DOCUMENTS 635097  4/1950  United Kingdom .

OTHER PUBLICATIONS

Factory Chart I.S. 4033, Hartford-Empire I.S. Machine Operating Manual, 1955, p. 85.

Primary Examiner—S. Leon Bashore
Assistant Examiner—K. M. Hastings

EXEMPLARY CLAIM

[1. The method of making a bottle parison which comprises the steps of opening the neck orifice of a parison mold, sucking air through the other end of said mold by a vacuum drawn through the opened neck orifice of the mold, introducing a charge of glass through the other end of the mold, seating a closure member in the neck orifice of the mold as the glass charge reaches the neck orifice, closing the other end of said mold, and immediately after the glass fills the portion of said mold adjacent said neck orifice, withdrawing the closure member from the neck orifice and counter-blowing the parison therethrough.]

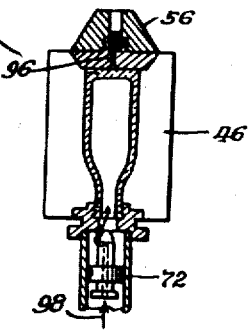

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-4 are cancelled.

* * * * *